Dec. 25, 1928.
E. CONTI
SHOCK ARRESTER
Filed Feb. 10, 1928
1,696,472
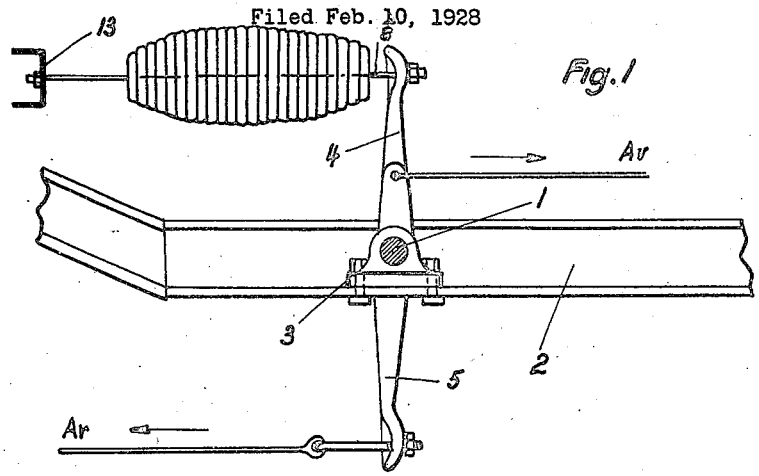
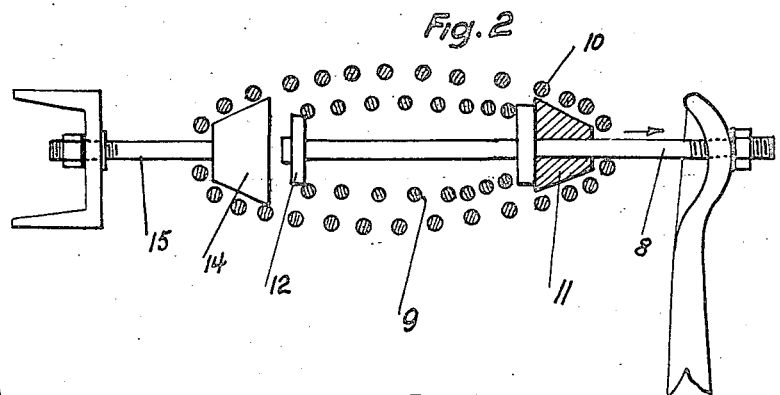
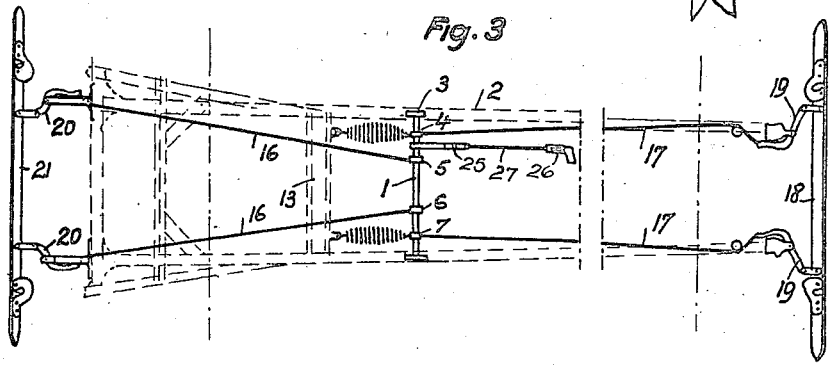
Witnesses:
Gentizon Robert
Inventor:
Emile Conti
per Fred F. Barlow
Attorney Patented Dec. 25, 1928.

1,696,472

UNITED STATES PATENT OFFICE.

EMILE CONTI, OF ALFORTVILLE, FRANCE.

SHOCK ARRESTER.

Application filed February 10, 1928, Serial No. 253,472, and in France November 29, 1927.

The present invention relates to shock arresters for automobiles of the type in which the shocks are absorbed by springs placed beneath the chassis of the conveyance, the said springs being connected at one extremity by means of suitable cables to oscillating levers upon which is mounted the buffer bar.

The invention pertains to an arrangement of levers mounted on a cross bar, the said levers being united by means of tension cables to traction and compression springs disposed in pairs. In this way the slight shocks to which the shock arrester is subjected are easily absorbed by the small compression springs, while the violent shocks are absorbed in two strokes, by the compression spring during the first stroke whose complete operation causes that of the traction spring for the following stroke. These improvements in the said shock absorber assure operation against the hardest tests, and trials effected with the device have demonstrated that an automobile driven at a speed of more than 30 miles per hour can collide with an obstacle without material damage.

The accompanying drawing shows, by way of example, one form of execution of the invention.

In the drawing—

Fig. 1 shows a view in partial elevation of the shock absorbing levers and springs;

Fig. 2 is a section through the compression and traction springs with the clamping means; and Fig. 3 is a view in plan showing the exact disposition of the cables and shock absorbing springs.

According to Fig. 1, a cross bar 1 is mounted between the two longitudinal beam members 2 of the chassis by means of bearings 3 fixed thereto. Fixed to the said cross bar are levers 4, 5, 6 and 7, the longitudinal position and inclination of these levers being adjustable to permit the shock absorber to be regulated.

At the extremity of lever 4 is attached a rod 8 of a compression spring 9 disposed on the interior of a powerful spring 10 which is subjected to traction. The grouping of the springs is effected in the following manner:

The traction spring 10 carries a member 11 of the form of a truncated cone at one of its extremities and within the spirals thereof. The said member 11 is perforated axially for receiving the rod 8 of lever 4, the said rod being furnished with a washer or cross piece 12 at its extremity upon which bear the end spirals of the compression spring 9. It follows that when the lever 4 or the lever 7 is displaced following a partial movement of rotation, the compression spring 9 only enters into play. If this movement is continued further the traction spring 10 functions in its turn. The two traction springs 10 are connected to the cross beam 13 of the chassis by means of a truncated conical member 14 placed therein and rigid with a rod 15 having a threaded end furnished with a regulating lock-nut.

The levers are of the reinforced type furnished at their extremities with a convex part with a view to permitting displacement in accordance with the different angular positions of cables 16 and 17 and of rods 8.

The cables 17 are connected to pivoted levers 19 of the front buffer bar 18 and to the levers 4 and 7 and at a position situated about 1/3 the distance up to the end of the said levers as shown in Fig. 1. The rear cables 16 are similarly connected to pivoted levers 20 of the rear buffer bar 21 and to the extremity of levers 5 and 6 on the cross bar 1.

The front shock absorbers function as follows:

When the conveyance meets an obstacle, the front buffer bar 18 mounted on the two oscillating levers 19 is displaced toward the rear carrying with it the two levers in its movement according to the magnitude of the shock to a greater or less distance. The said levers pull the cables 17 controlling levers 4 and 7 which in becoming displaced according to a partial movement of rotation cause the compression of the small spring 9, and if the shock is great enough the traction of the second spring 10. It follows that the shocks are completely absorbed without the chassis becoming injured.

The cross bar 1 is preferably provided with a special lever 25 connected to a brake lever 26 by means of a rod 27 controlling a servo-brake (not shown) acting automatically on the brake drums of the four wheels. There is thus produced an abrupt stopping of the conveyance as shown as the shock absorbers commence to function.

It is to be understood that the pivoted levers 20 may be disposed at any angle and permit the rear buffer bar 21 to be inflected in the horizontal sense without the butt ends at the front and rear of the vehicle being called upon at any time to give way.

These characteristics are new and of the greatest importance for the normal functioning of shock absorbers. Furthermore the shocks being absorbed by the springs in a normal manner the occupants of the conveyance are no longer precipitated toward the front under the effect of a violent shock but remain in their place which is a great advantage inasmuch as all accidental injury to the body is eliminated.

While I have shown what I deem to be the preferable form of my device I do not wish to be limited thereto as there might be various changes made in the details of construction and the arrangement of parts without departing from the spirit of the invention comprehended within the scope of the appended claims.

In particular, my improved shock absorbing device is adaptable to any sort of conveyance adapted to travel either on the road or upon rails. In connection with locomotives the device is particularly effective, in which case, the springs might readily be replaced by pneumatic or liquid dashpots.

Having thus described my invention, what I claim as new and desire to secure by Letters Patent is:—

1. In a motor vehicle having a chassis and a buffer bar pivotally mounted on one end of said chassis, the combination of a plurality of levers carried by said chassis, a plurality of cables interconnecting certain of said levers and said buffer bar, shock absorbing means responsive to a slight movement of said buffer bar cooperating with certain of said levers and a second shock absorbing means responsive to said first mentioned shock absorbing means when the movement of said buffer bar exceeds a predetermined amount for the purpose set forth.

2. In a motor vehicle having a chassis and a buffer bar pivotally mounted on one end of said chassis, the combination of a plurality of levers carried by said chassis, a plurality of cables interconnecting certain of said levers and said buffer bar, a shock absorbing spring responsive to a slight movement of said buffer bar cooperating with certain of said levers and a second shock absorbing spring responsive to said first mentioned shock absorbing spring when the movement of said buffer bar exceeds a predetermined amount for the purpose set forth.

3. In a motor vehicle having a chassis and a buffer bar pivotally mounted on each end of said chassis, the combination of a plurality of levers carried by said chassis, a plurality of cables interconnecting certain of said levers and said front and rear buffer bars, shock absorbing means responsive to a slight movement of said buffer bar cooperating with certain of said levers and a second shock absorbing means responsive to said first mentioned shock absorbing means when the movement of said buffer bar exceeds a predetermined amount for the purpose set forth.

4. In a motor vehicle having a chassis and a buffer bar pivotally mounted on each end of said chassis, the combination of a plurality of levers carried by said chassis, a plurality of cables interconnecting certain of said levers and said front and rear buffer bars, a shock absorbing spring responsive to a slight movement of said buffer bar cooperating with certain of said levers and a second shock absorbing spring responsive to said first mentioned shock absorbing spring when the movement of said buffer bar exceeds a predetermined amount for the purpose set forth.

5. In a motor vehicle having a chassis and a buffer bar pivotally mounted on one end of said chassis, the combination of a rotatably mounted shaft on said chassis, a plurality of levers fixed to said shaft, a plurality of cables interconnecting certain of said levers and said buffer bar, a rod carried by each of the remaining levers, a light spring mounted on each of said rods and fixed at one end thereto, a slidably mounted collar on each of said rods fastened to the other end of its respective light spring, a heavy spring enclosing each of said light springs and collars and means for adjustably securing the end of said heavy spring to said chassis for the purpose set forth.

6. In a motor vehicle having a chassis and a buffer bar pivotally mounted on each end of said chassis, the combination of a plurality of levers, a rotatably mounted shaft carrying said levers mounted on said chassis, a plurality of cables interconnecting certain of said levers and said front and rear buffer bars, a rod carried by each of the remaining levers, a light spring mounted on each of said rods and fixed at one end thereto, a slidably mounted collar on each of said rods fastened to the other end of its respective light spring, a heavy spring enclosing each of said light springs and collars and means for adjustably securing the end of said heavy spring to said chassis for the purpose set forth.

7. In a motor vehicle having a chassis and a buffer bar pivotally mounted on one end of said chassis, the combination of a rotatably mounted shaft on said chassis, a plurality of levers fixed to said shaft, a plurality of cables interconnecting certain of said levers and said buffer bar, a rod carried by each of the remaining levers, a light spring mounted on each of said rods and fixed at one end thereto, a slidably mounted collar on each of said rods fastened to the other end of its respective light spring, a heavy spring enclosing each of such light springs and collars, a threaded rod extending through said chassis, a conical flange on one end of said rod embraced by the coils of said heavy spring and an adjustable lock nut on the other extremity of said rod for the purpose set forth.

8. In a motor vehicle having a chassis and a buffer bar pivotally mounted on each end of said chassis, the combination of a plurality of levers, a rotatably mounted shaft carrying said levers mounted on said chassis, a plurality of cables interconnecting certain of said levers and said front and rear buffer bars, a rod carried by each of the remaining levers, a light spring mounted on each of said rods and fixed at one end thereto, a slidably mounted collar on each of said rods fastened to the other end of its respective light spring, a heavy spring enclosing each of said light springs and collars, a threaded rod extending through said chassis, a conical flange on one end of said rod embraced by the coils of said heavy spring and an adjustable lock nut on the other extremity of said rod for the purpose set forth.

9. In a motor vehicle having a chassis and a buffer bar pivotally mounted on one end of said chassis, the combination of a plurality of levers carried by said chassis, a plurality of cables interconnecting certain of said levers and said buffer bar, shock absorbing means responsive to a slight movement of said buffer bar associated with certain of said levers, a second shock absorbing means responsive to said first mentioned shock absorbing means when the movement of said buffer bar exceeds a predetermined amount, and an auxiliary brake lever operated by said first mentioned levers.

10. In a motor vehicle having a chassis and a buffer bar pivotally mounted on each end of said chassis, the combination of a plurality of levers carried by said chassis, a plurality of cables interconnecting certain of said levers and said front and rear buffer bars, shock absorbing means responsive to a slight movement of said buffer bar associated with certain of said levers, a second shock absorbing means responsive to said first mentioned shock absorbing means when the movement of said buffer bar exceeds a predetermined amount, and an auxiliary brake lever operated by said first mentioned levers.

In testimony whereof, I have signed my name to this specification at Paris, France.

EMILE CONTI.